United States Patent
Beers et al.

(10) Patent No.: US 10,513,948 B2
(45) Date of Patent: *Dec. 24, 2019

(54) ROTARY MACHINE AIR DEFLECTOR

(71) Applicant: Hamilton Sundstrand Corporation, Charlotte, NC (US)

(72) Inventors: Craig M. Beers, Wethersfield, CT (US); Christopher McAuliffe, Windsor, CT (US); Murtuza Lokhandwalla, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/170,855

(22) Filed: Oct. 25, 2018

(65) Prior Publication Data

US 2019/0063258 A1 Feb. 28, 2019

Related U.S. Application Data

(63) Continuation of application No. 14/461,789, filed on Aug. 18, 2014, now Pat. No. 10,113,445.

(51) Int. Cl.
| | |
|---|---|
| *F01D 25/12* | (2006.01) |
| *F16C 37/00* | (2006.01) |
| *F16C 17/02* | (2006.01) |
| *F04D 29/057* | (2006.01) |
| *B64D 13/00* | (2006.01) |

(52) U.S. Cl.
CPC .......... *F01D 25/125* (2013.01); *F16C 37/002* (2013.01); *B64D 13/00* (2013.01);
(Continued)

(58) Field of Classification Search
CPC .. F01D 25/125; F04D 29/056; F04D 29/0563; F04D 29/057; F04D 29/059;
(Continued)

(56) References Cited

U.S. PATENT DOCUMENTS

| | | |
|---|---|---|
| 2,493,160 A | 1/1950 | Morley |
| 5,113,670 A | 5/1992 | McAuliffe et al. |

(Continued)

FOREIGN PATENT DOCUMENTS

| | | |
|---|---|---|
| BE | 451397 A | 2/1943 |
| EP | 1132578 A2 | 9/2001 |

(Continued)

OTHER PUBLICATIONS

Partial European Search Report for EP Application No. 15181122.1, dated Jan. 26, 2016, 6 Pages.

(Continued)

*Primary Examiner* — Christopher Verdier
(74) *Attorney, Agent, or Firm* — Kinney & Lange, P.A.

(57) ABSTRACT

A rotary machine includes a shaft extending through the rotary machine; a bearing positioned around the shaft; and an air deflector mounted on the shaft between the bearing and the shaft, wherein the air deflector has a first cylindrical body portion that is connected to a second cylindrical body portion with a ramp portion. A method for cooling a bearing positioned around a rotating shaft includes providing air to a cavity that surrounds a rotating shaft; deflecting the air towards an inner surface of a bearing that is positioned radially outward of the rotating shaft, wherein the air is deflected with an air deflector that is mounted on the rotating shaft; and flowing the air between an outer surface of the air deflector and the inner surface of the bearing.

17 Claims, 3 Drawing Sheets

(52) U.S. Cl.
CPC ........ *F04D 29/057* (2013.01); *F05B 2240/53* (2013.01); *F05D 2240/53* (2013.01); *F16C 17/024* (2013.01); *F16C 37/00* (2013.01); *Y02T 50/675* (2013.01)

(58) Field of Classification Search
CPC ............. F05D 2240/50; F05D 2240/53; F05D 2240/54; F05B 2240/50; F05B 2240/53; F05B 2240/54; F16C 17/024; F16C 37/002
USPC .................................. 415/111, 112, 180, 229
See application file for complete search history.

(56) References Cited

U.S. PATENT DOCUMENTS

| | | | |
|---|---|---|---|
| 5,450,719 | A | 9/1995 | Marsh |
| 8,496,533 | B2 | 7/2013 | Beers et al. |
| 8,517,665 | B2 | 8/2013 | Lugo et al. |
| 10,113,445 | B2 * | 10/2018 | Beers .................... F01D 25/125 |
| 2011/0229351 | A1 | 9/2011 | Beers et al. |
| 2012/0064814 | A1 | 3/2012 | Beers et al. |
| 2012/0152383 | A1 | 6/2012 | Lugo et al. |

FOREIGN PATENT DOCUMENTS

| | | |
|---|---|---|
| EP | 2952697 A1 | 12/2015 |
| GB | 595348 A | 12/1947 |

OTHER PUBLICATIONS

Extended European Search Report for EP Application No. 15181122.1, dated Apr. 25, 2016, 12 Pages.
Extended European Search Report for EP Application No. 17176664.5, dated Sep. 11, 2017, 10 Pages.

* cited by examiner

ROTARY MACHINE AIR DEFLECTOR

CROSS-REFERENCE TO RELATED APPLICATION(S)

This application is a continuation of and claims priority to U.S. application Ser. No. 14/461,789, issued as U.S. Pat. No. 10,113,445, filed on Aug. 18, 2014, and entitled "Rotary Machine Air Deflector," the disclosure of which is incorporated by reference in its entirety.

BACKGROUND

The present invention relates to rotary machines, and in particular, to an air deflector for an air cycle machine.

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the ambient air temperature is very low. Thus, under most conditions, heat must be removed from air by the air cycle machine before the air is delivered to the aircraft cabin.

To condition the air as needed, air cycle machines include a fan section, a compressor section, and a turbine section that are all mounted on a common shaft. The compressor receives partially compressed air from the aircraft and further compresses the air. The compressed air then moves through a heat exchanger and is cooled by the fan section. The air then moves through the turbine section where it is expanded for use in the aircraft, for example, for use as cabin air. The turbine section also extracts energy from the air and uses the energy to drive the fan section and the compressor section via the common shaft.

Air cycle machines also include bearings that are positioned around the common shaft. The bearings are cooled by passing a cooling air flow through a cavity that is adjacent the bearing. The cooling air flow then exits the cavity and is discharged from the air cycle machine into an ambient. The cooling air flow is limited in that it can only cool the bearing using convective heat transfer. The cooling air flow is further limited in that the cooling air flow in the cavity flows through a center of the cavity, meaning a majority of the cooling air flow does not flow across a surface of the bearing.

SUMMARY

A rotary machine includes a shaft extending through the rotary machine; a bearing positioned around the shaft; and an air deflector mounted on the shaft between the bearing and the shaft, wherein the air deflector has a first cylindrical body portion that is connected to a second cylindrical body portion with a ramp portion.

A method for cooling a bearing positioned around a rotating shaft includes providing air to a cavity that surrounds a rotating shaft; deflecting the air towards an inner surface of a bearing that is positioned radially outward of the rotating shaft, wherein the air is deflected with an air deflector that is mounted on the rotating shaft; and flowing the air between an outer surface of the air deflector and the inner surface of the bearing.

DETAILED DESCRIPTION

In general, the present disclosure is an air deflector for use in a rotary machine. The air deflector can be mounted on a shaft between a bearing and the shaft to dissipate heat away from the bearing and out of the rotary machine. The air deflector includes a body with a bore running through the body in which a shaft can be positioned. The body of the air deflector includes a first body portion, a ramp portion, and a second body portion. The ramp portion is positioned between the first body portion and the second body portion. The ramp portion has a conical shape with an incline to force cooling air flowing around the air deflector outwards towards the bearing. The cooling air flowing across the bearing can cool the bearing with convective heat transfer.

Figure 1:
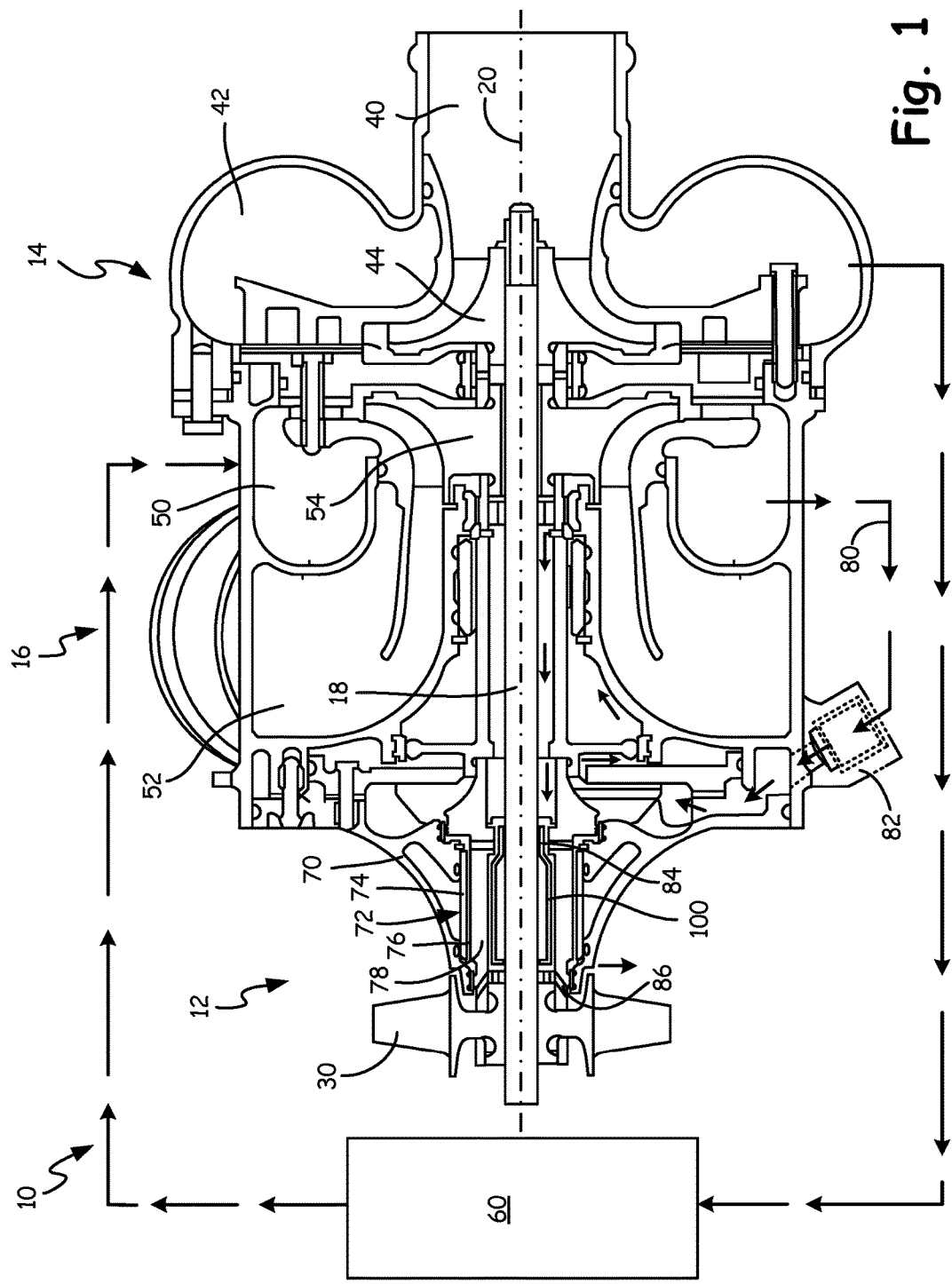
FIG. 1 is a cross-sectional view of an air cycle machine.

FIG. 1 is a cross-sectional view of air cycle machine 10. Air cycle machine 10 includes fan section 12, compressor section 14, and turbine section 16 that are all mounted on shaft 18. Shaft 18 rotates around central axis 20. Fan section 12 includes fan blade 30. Compressor section 14 includes compressor inlet 40, compressor outlet 42, and compressor nozzle 44. Turbine section 16 includes turbine inlet 50, turbine outlet 52, and turbine nozzle 54. Also shown in FIG. 1 is heat exchanger 60, housing 70, bearing 72, bearing sleeve 74, bearing foil 76, bearing journal 78, cooling air flow 80, cooling air flow inlet 82, cavity 84, opening 86, and air deflector 100.

Shaft 18 is a rod, such as a titanium tie-rod, used to connect other components of air cycle machine 10. Central axis 20 is an axis with respect to which other components may be arranged.

Fan section 12 includes fan blade 30. Fan section 12 is mounted on shaft 18. Fan blades 30 rotate around shaft 18. Fan section 12 typically draws in ram air from a ram air scoop or alternatively from an associated gas turbine or other aircraft component. Fan section 12 may also be used to draw air through heat exchanger 60.

Compressor section 14 includes compressor inlet 40, compressor outlet 42, and compressor nozzle 44. Compressor section 14 is mounted on shaft 18. Compressor inlet 40 is a duct through which air is received to be compressed. Compressor outlet 42 is a duct through which air can be routed to other systems after it has been compressed in compressor section 14. Compressor nozzle 44 is a nozzle section that rotates through the air in compressor section 14. In particular, compressor nozzle 44 is a rotor or impeller.

Turbine section 16 includes turbine inlet 50, turbine outlet 52, and turbine nozzle 54. Turbine section 16 is mounted on shaft 18. Turbine inlet 50 is a duct through which air passes prior to expansion in turbine section 16. Turbine outlet 52 is a duct through which air can be routed after it has been expanded to be used in other areas on an aircraft. For example, air can be routed out of turbine outlet 52 and into a cabin for use as cabin air. Turbine nozzle 54 is a nozzle section that extracts energy from air passing through turbine section 16. In particular, turbine nozzle 54 is a rotor or impeller. Air passing through turbine section 16 drives the rotation of turbine section 16 and any attached components, including shaft 18, fan section 12, and compressor section 14.

Air is received in air cycle machine 10 at compressor inlet 40. The air can be ram air from a ram air scoop or the air can be pulled into air cycle 10 using fan section 12 from an associated gas turbine or other aircraft component. The air passes through compressor section 14 where it is compressed with compressor nozzle 44 and then discharged out of compressor outlet 42. From compressor outlet 42, the air can pass through heat exchanger 60. Fan section 12 may be used to draw air through heat exchanger 60. Air that exits heat exchanger 60 is then routed into turbine inlet 50. The air expands as it passes through turbine section 16 and it drives turbine nozzle 54 before it is discharged out of turbine outlet 52. Air that is discharged out of turbine outlet 52 can then be routed to other parts of the aircraft, for example, for use as cabin air.

Adjacent fan section 12 in air cycle machine 10 is housing 70. Housing 70 forms an outer portion of air cycle machine 10. Bearing 72 is positioned between shaft 18 and housing 70. Bearing 72 is a foil bearing in the embodiment shown in FIG. 1. Bearing 72 includes bearing sleeve 74, bearing foil 76, and bearing journal 78. Bearing foil 76 is positioned between bearing sleeve 74 and bearing journal 78. Bearing sleeve 74 forms an outer surface of bearing 72 and bearing journal 78 forms an inner surface of bearing 72. The inner surface of bearing journal 78 faces shaft 18. Air deflector 100 is mounted on shaft 18 between bearing 72 and shaft 18 to dissipate heat out of bearing 72.

Cooling air flow 80 is bled from the air being routed from heat exchanger 60 to turbine inlet 50. Cooling air flow 80 is routed through cooling air flow inlet 82 and through air cycle machine 10 to cavity 84. Cavity 84 is an open area surrounding shaft 18 that is defined by fan section 12 and turbine section 16. Air deflector 100 is positioned in cavity 84 adjacent fan blade 30. Cooling air flow 80 will flow through cavity 84 and will pass around air deflector 100 to cool bearing 72. Cooling air flow 80 will then exit through opening 86 that is formed between housing 70 and fan blade 30 and will be discharged into an ambient out of air cycle machine 10.

Air cycle machine 10 is described as having fan section 12, compressor section 14, and turbine section 16. In alternate embodiments, air cycle machine 10 includes at least one of fan section 12 with fan blade 30 mounted on shaft 18, compressor section 14 with compressor nozzle 44 mounted on shaft 18, and turbine section 16 with turbine nozzle 54 mounted on shaft 18.

Figure 2A:
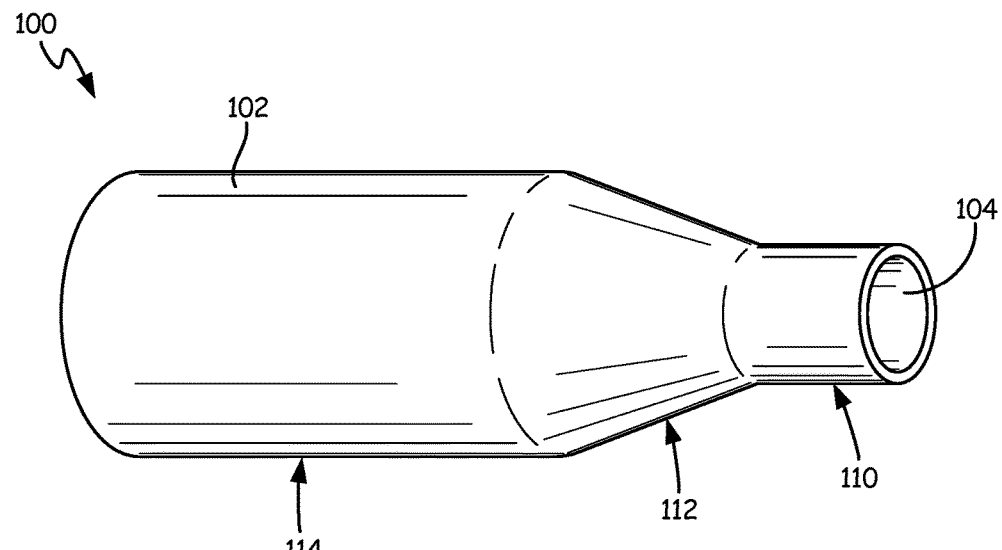
FIG. 2A is a perspective view of an air deflector.
Figure 2B:
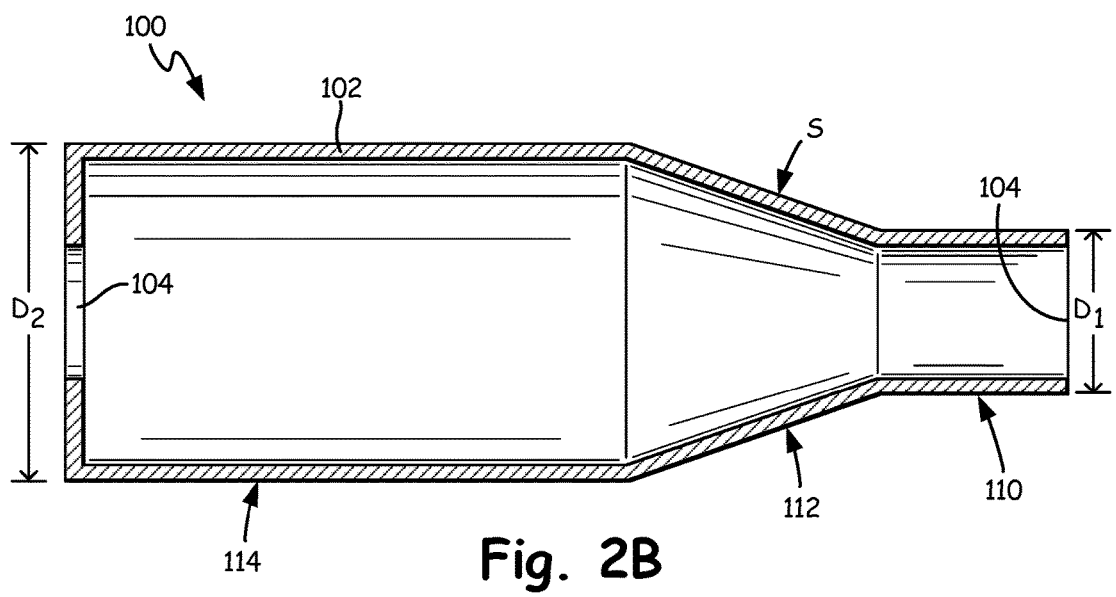
FIG. 2B is a cross-sectional side view of the air deflector seen in FIG. 2A.

FIG. 2A is a perspective view of air deflector 100. FIG. 2B is a cross-sectional side view of air deflector 100 seen in FIG. 2A. Air deflector 100 includes body 102 and bore 104. Air deflector 100 further includes first body portion 110, ramp portion 112, and second body portion 114. Also shown in FIGS. 2A-2B are first diameter $D_1$, second diameter $D_2$, and slope S.

Air deflector 100 includes body 102. Air deflector 100 can be made out of thermally conductive materials or thermally insulating materials. This can include metallic materials, plastic materials, ceramic materials, or any other suitable material. Bore 104 extends axially through body 102 with a first opening at a first end of body 102 and a second opening at a second end of body 102. Bore 104 runs through air deflector 100 so that a shaft or other part can be positioned in bore 104 of air deflector 100.

Body 102 of air deflector 100 includes first body portion 110, ramp portion 112, and second body portion 114. First body portion 110 has a cylindrical shape with first diameter $D_1$. A first end of first body portion 110 forms the first end of air deflector 100, and a second end of first body portion 110 is connected to a first end of ramp portion 112. Ramp portion 112 has a conical shape and extends from first diameter $D_1$ to second diameter $D_2$. Ramp portion 112 has an incline with slope S. The second end of ramp portion 112 is connected to a first end of second body portion 114. Second body portion 114 is cylindrically shaped with second diameter $D_2$. A second end of second body portion 114 forms the second end of body 102.

Air deflector 100 can be used in any rotary machine that has a shaft and a bearing positioned around the shaft. This can include air cycle machines and other turbine and motor driven compressors and fans. Air deflector 100 is advantageous, as ramp portion 112 of air deflector 100 forces cooling air to flow closer to a surface of a hot part that is positioned around air deflector 100. The cooling air flow will absorb heat from the hot part as it flows across a surface of the hot part to cool the hot part. Air deflector 100 is further advantageous, as it is low weight and is easy and cost effective to manufacture.

Figure 3:
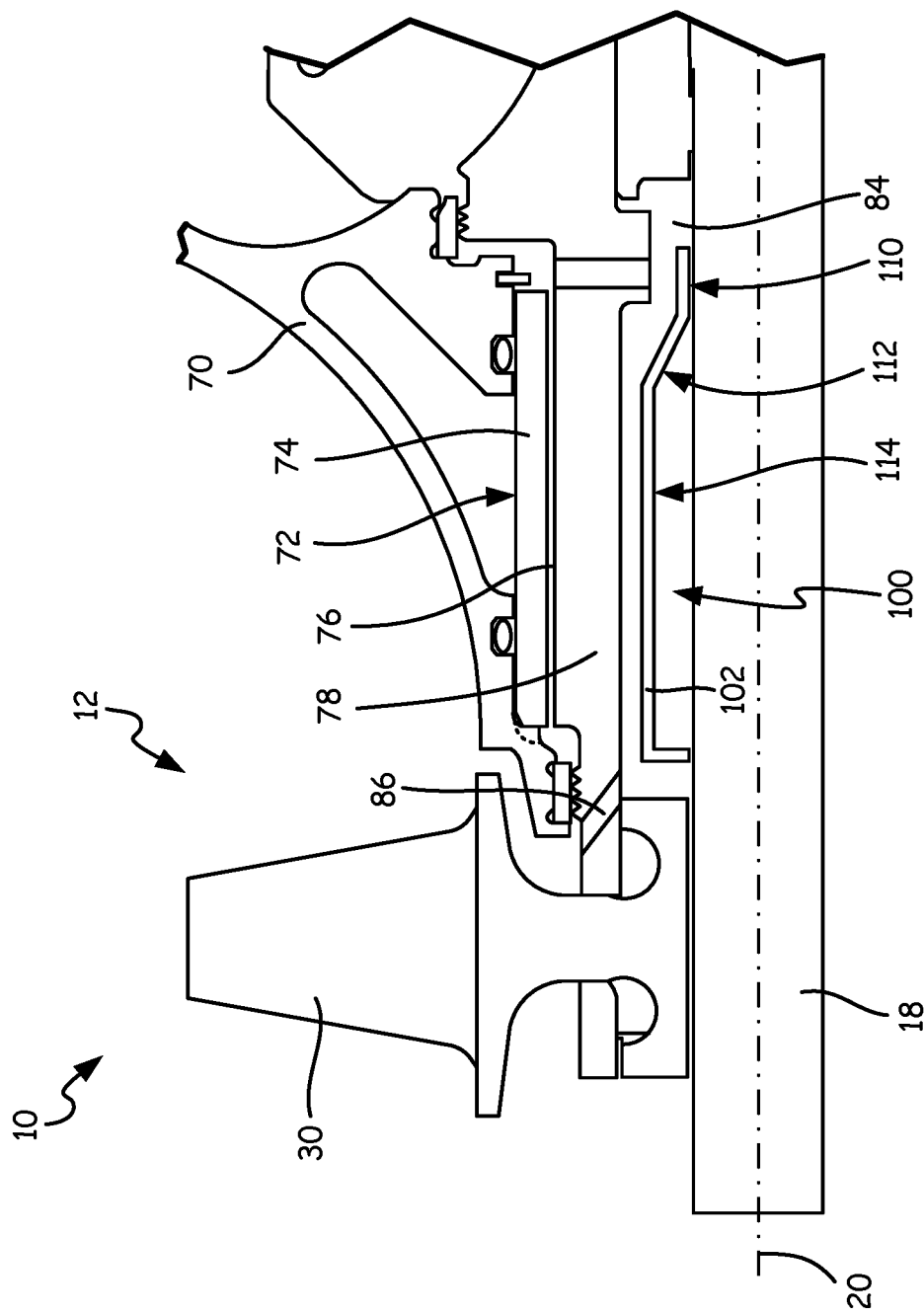
FIG. 3 is an enlarged cross-sectional view of the air deflector in a fan section of the air cycle machine.

FIG. 3 is an enlarged cross-sectional view of air deflector 100 in fan section 12 of air cycle machine 10. The portion of air cycle machine 10 shown in FIG. 3 includes fan section 12 (including fan blade 30), shaft 18, housing 70, bearing 72, bearing sleeve 74, bearing foil 76, bearing journal 78, cavity 84, opening 86, and air deflector 100. Air deflector 100 further includes body 102, including first body portion 110, ramp portion 112, and second body portion 114.

Air cycle machine 10 includes fan section 12 that is mounted on shaft 18. Shaft 18 is a common shaft that runs through air cycle machine 10 and that rotates around central axis 20. Fan section 12 includes fan blade 30 that rotates with shaft 18 around central axis 20. Adjacent fan blade 30 is housing 70. Housing 70 forms an outer portion of air cycle machine 10.

Positioned between shaft 18 and housing 70 is bearing 72. Bearing 72 is a foil bearing that includes bearing sleeve 74, bearing foil 76, and bearing journal 78. Bearing foil 76 is positioned between bearing sleeve 74 and bearing journal 78. Bearing sleeve 74 forms an outer surface of bearing 72 and bearing journal 78 forms an inner surface of bearing 72. The inner surface of bearing journal 78 faces shaft 18. Cavity 84 is formed between shaft 18 and the inner surface of bearing journal 78. Cooling air flow can be routed through cavity 84 to cool bearing 72. The cooling air flow can then exit through opening 86. Opening 86 is an opening through bearing journal 78 between fan blade 30 and housing 70. After cooling air flows through opening 86 it can be discharged from air cycle machine 10 into an ambient.

Positioned in cavity 84 around shaft 18 is air deflector 100. Air deflector 100 is mounted on shaft 18 so that it rotates with shaft 18 around central axis 20. Air deflector 100 includes body 102 with first body portion 110, ramp portion 112, and second body portion 114. Ramp portion 112 is positioned between first body portion 110 and second body portion 114. Ramp portion 112 has a conical shape with an incline to force cooling air flowing through cavity 84 into an area between second body portion 114 and the inner surface of bearing journal 78.

Air deflector 100 transfers heat out of bearing 72 by forcing the cooling air closer to the inner surface of bearing journal 78. This allows for convective heat transfer, as heat is being transferred into the air that is flowing across the inner surface of bearing journal 78. The cooling air flow that is flowing through cavity 84 between the second body portion 114 of air deflector 100 and bearing journal 78 flows through opening 86 where it is discharged out of air cycle machine 10. This discharges heat from bearing 72 into an ambient through the cooling air flow.

Without air deflector 100, bearing 72 would be cooled by flowing air through cavity 84. That cooling method would be inefficient, as cooling air flowing through cavity 84 would have a large area through which it flows. A majority of the cooling air would flow through the center of cavity 84 between shaft 18 and journal bearing 68. This would make the cooling method inefficient, as a majority of the cooling air would not come into contact with the inner surface of bearing journal 78.

Air deflector 100 is advantageous over prior art cooling systems, as the cooling air flow is forced into a smaller area between second body portion 114 of air deflector 100 and the inner surface of bearing journal 78. This increases the effectiveness and efficiency of the convective heat transfer, as more cooling air flow is coming into contact with the inner surface of bearing journal 78. Air deflector 100 thus improves the cooling of bearing 72 to make bearing 72 more reliable.

Air deflector 100 also provides several advantages for air cycle machine 10. First, air deflector 100 makes air cycle machine 10 more effective, as less cooling air flow is needed to cool bearing 72. This means less cooling air flow needs to be routed away from the main flow path through air cycle machine 10, thus improving the overall efficiency of air cycle machine 10. Second, as more air is kept in the main flow path through air cycle machine 10, the heat exchanger has to do less work. This means the size and weight of the heat exchanger can be reduced. The improved efficiency and effectiveness of air cycle machine 10 with air deflector 100 outweighs any concerns about the weight or cost of adding air deflector 100 to air cycle machine 10. Air deflector 100 greatly improves the thermodynamic performance of air that is flowing through air cycle machine 10.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A rotary machine comprising:
   a shaft extending through the rotary machine;
   a bearing positioned around the shaft;
   an air deflector mounted on the shaft between an inner surface of the bearing and the shaft, wherein the air deflector has a first cylindrical body portion that is connected to a second cylindrical body portion with a ramp portion, and wherein an inner surface of the first cylindrical body portion abuts an outer surface of the shaft; and
   a cavity around the shaft defined by a housing and the bearing, wherein the air deflector is positioned in the cavity so that cooling air flowing through the cavity will flow between an outer surface of the air deflector and the inner surface of the bearing to cool the bearing.

2. The rotary machine of claim 1, and further comprising at least one of the following:
   a fan section with a fan blade mounted on the shaft;
   a compressor section with a compressor nozzle mounted on the shaft; or
   a turbine section with a turbine nozzle mounted on the shaft.

3. The rotary machine of claim 1, wherein the bearing comprises a foil bearing.

4. The rotary machine of claim 3, wherein the foil bearing comprises:
   a bearing sleeve forming an outer surface of the foil bearing;
   a bearing journal forming an inner surface of the foil bearing that faces the shaft; and
   a bearing foil positioned between the bearing sleeve and the bearing journal.

5. The rotary machine of claim 1, wherein the air deflector further comprises:
   a bore running through the air deflector with a first opening at a first end of the air deflector and a second opening at a second end of the air deflector, wherein the shaft extends through the bore.

6. The rotary machine of claim 1, wherein the first cylindrical body portion has a first diameter and the second cylindrical body portion has a second diameter.

7. The rotary machine of claim 6, wherein the second diameter is larger than the first diameter.

8. The rotary machine of claim 6, wherein the ramp portion has a conical shape that extends from the first diameter to the second diameter.

9. The rotary machine of claim 1, the cooling air that flows through the cavity between the outer surface of the air deflector and the inner surface of the bearing convectively cools the bearing.

10. The rotary machine of claim 1, wherein the ramp portion of the air deflector is configured to force the cooling air that is flowing through the cavity closer to the inner surface of the bearing.

11. A method for cooling a bearing positioned around a rotating shaft, the method comprising:
    providing air to a cavity that surrounds the rotating shaft;
    deflecting the air outwards from the shaft and towards an inner surface of the bearing that is positioned radially outward of the rotating shaft, wherein the air is deflected with an air deflector that is mounted on and abuts the rotating shaft; and
    flowing the air between an outer surface of the air deflector and the inner surface of the bearing.

12. The method of claim 11, wherein deflecting the air with an air deflector includes forcing the air closer to the inner surface of the bearing using a ramp portion of the air deflector.

13. The method of claim 11, wherein flowing the air between the outer surface of the air deflector and the inner surface of the bearing will cool the bearing with convective heat transfer between the bearing and the air flowing across the inner surface of the bearing.

14. The method of claim 11, wherein the air deflector has a first cylindrical body portion that is connected to a second cylindrical body portion with a ramp portion.

15. The method of claim 14, wherein an inner surface of the first cylindrical body portion abuts an outer surface of the shaft.

16. The method of claim 11, and further comprising:
   expelling the air out of the cavity surrounding the rotating shaft.

17. The method of claim 16, wherein expelling the air out of the cavity surrounding the rotating shaft includes expelling heat transferred from the bearing to the air flowing through the cavity out of the cavity and into an ambient.

* * * * *